United States Patent

Agarwal et al.

[11] Patent Number: 5,832,533
[45] Date of Patent: Nov. 3, 1998

[54] METHOD AND SYSTEM FOR ADDRESSING REGISTERS IN A DATA PROCESSING UNIT IN AN INDEXED ADDRESSING MODE

[75] Inventors: Ramesh Chandra Agarwal, Yorktown Heights; Fred G. Gustavson, Briarcliff Manor, both of N.Y.; Mark A. Johnson, Austin; Brett Olsson, Round Rock, both of Tex.

[73] Assignee: International Business Machines Corporation, Armonk, N.Y.

[21] Appl. No.: 687,825

[22] Filed: Jul. 26, 1996

Related U.S. Application Data

[63] Continuation of Ser. No. 368,171, Jan. 4, 1995, abandoned.

[51] Int. Cl.$^6$ .............................. G06F 12/02; G06F 12/06
[52] U.S. Cl. ...................... 711/2; 711/1; 711/2; 711/202; 711/203; 711/154; 711/270
[58] Field of Search ................................ 395/421.1, 412, 395/421.04, 421.05, 421.07; 711/5, 154, 212, 206, 205, 209, 3, 207, 203, 220

[56] References Cited

U.S. PATENT DOCUMENTS

| | | | |
|---|---|---|---|
| 4,538,223 | 8/1985 | Vahlstrom et al. | 395/421.04 |
| 4,586,130 | 4/1986 | Butts et al. | 395/417 |
| 4,594,682 | 6/1986 | Drimak | 395/800 |
| 4,616,313 | 10/1986 | Aoyagi | 395/388 |
| 4,652,995 | 3/1987 | Pilat | 395/421.1 |
| 4,704,680 | 11/1987 | Saxe | 395/421.01 |
| 4,722,049 | 1/1988 | Lahti | 395/800 |
| 4,858,115 | 8/1989 | Rusterholz et al. | 395/800 |
| 4,873,630 | 10/1989 | Rusterholz et al. | 395/800 |
| 4,881,168 | 11/1989 | Inagami et al. | 395/800 |
| 4,888,679 | 12/1989 | Fossum et al. | 395/800 |
| 4,926,317 | 5/1990 | Wallach et al. | 395/403 |
| 4,958,274 | 9/1990 | Dutton et al. | 395/559 |
| 5,032,985 | 7/1991 | Curran et al. | 395/207 |
| 5,091,853 | 2/1992 | Watanabe et al. | 395/388 |
| 5,111,389 | 5/1992 | McAuliffe et al. | 395/413 |
| 5,133,059 | 7/1992 | Ziegler et al. | 395/467 |
| 5,133,061 | 7/1992 | Melton et al. | 395/455 |
| 5,134,697 | 7/1992 | Scheffler | 395/497.02 |
| 5,148,536 | 9/1992 | Witek et al. | 395/467 |
| 5,179,674 | 1/1993 | Williams et al. | 395/414 |
| 5,197,141 | 3/1993 | Ito | 495/427 |
| 5,206,822 | 4/1993 | Taylor | 364/736 |
| 5,237,685 | 8/1993 | Toney | 395/207 |
| 5,249,280 | 9/1993 | Nash et al. | 395/405 |
| 5,265,237 | 11/1993 | Tobias et al. | 395/500 |
| 5,371,865 | 12/1994 | Aikawa et al. | 395/452 |
| 5,500,947 | 3/1996 | Uhler et al. | 395/387 |
| 5,524,265 | 6/1996 | Balmer et al. | 395/421.02 |

FOREIGN PATENT DOCUMENTS

| | | |
|---|---|---|
| 63-133269 | 6/1988 | Japan . |
| 64-88845 | 4/1989 | Japan . |

*Primary Examiner*—Eddie P. Chan
*Assistant Examiner*—Than V. Nguyen
*Attorney, Agent, or Firm*—Anthony V. S. England; Andrew J. Dillon

[57] ABSTRACT

In a data processing unit having a plurality of general purpose registers, an instruction is loaded. Such an instruction includes an operation, and at least one operand field, where the operand field specifies one of a plurality of base registers and a displacement value. To calculate a general purpose register address specified by such an operand field, the displacement value is added to a base value stored in a base register that is specified by a portion of the operand field. Finally, the data processing unit addresses a selected one of the general purpose registers, utilizing the calculated general purpose register address, for execution of the specified operation. Thus, the data processing unit is capable of addressing a larger number of general purpose registers than may be directly addressed utilizing a value represented by a limited number of bits within the operand field.

4 Claims, 6 Drawing Sheets

METHOD AND SYSTEM FOR ADDRESSING REGISTERS IN A DATA PROCESSING UNIT IN AN INDEXED ADDRESSING MODE

This is a continuation of application Ser. No. 08/368,171, filed 04 Jan. 1995 now abandoned.

CROSS-REFERENCE TO RELATED APPLICATIONS

The present application is related to the following copending applications:

application Ser. No. 08/313,970, entitled "Method and System For Performing SIMD-Parallel Operations In A Superscalar Data Processing System," Attorney Docket No. AT9-94-045, filed Sep. 28, 1994;

application Ser. No. 08/313,971, entitled "Method and System For Dynamically Reconfiguring A Register File In A Vector Processor," Attorney Docket No. AT9-94-046, filed Sep. 28, 1994;

application Ser. No. 08/368,172, entitled "Method And System For Vector Processing Utilizing Selected Vector Elements," Attorney Docket No. AT9-94-095, filed of even date herewith;

application Ser. No. 08/368,173, entitled "Method And System In A Data Processing System for Loading And Storing Vectors In A Plurality Of Modes," Attorney Docket No. AT9-94-073, filed of even date herewith; and application Ser. No. 08/368,176, entitled "Method And System For Addressing Registers In A Data Processing Unit In An indirect Addressing Mode," Attorney Docket No. AT9-94-165, filed of even date herewith;

all of which are assigned to the assignee herein, and incorporated herein by reference thereto.

BACKGROUND OF THE INVENTION

1. Technical Field

The present invention relates in general to an improved data processing system and in particular to an improved method and system for addressing register files in a data processing unit. Still more particularly, the present invention relates to an improved method and system for addressing register files in an indexed addressing mode.

2. Description of the Related Art

As semiconductor manufacturing technology evolves, it becomes possible to manufacture integrated circuits having increased circuit density. Such circuit density provides the opportunity to improve several aspects of circuit performance over previous circuit implementations. Increased circuit density also allows placing functional units closer to one another, thereby reducing the capacitive loading in the connection between functional units and decreasing the time required for signals to travel between functional units. Other opportunities for improving performance arise from the larger effective chip area which provides additional space for increasing circuit capacities, such as increasing the size of a register file. Large register files may lead to increased register use which may lead to reduced storage accesses, which in turn increases circuit performance.

Typically, a selected instruction format for a data processing unit (i.e., a central processing unit (CPU)) typically determines the number of registers in the CPU architecture because the field utilized to specify the register address—the operand field—has a fixed length in the CPU instruction. When the CPU architecture requires direct addressing of registers, the number of registers may not be larger than the number of registers which may be addressed by a number of bits in the operand field that provides the register address. Thus, increasing the number of registers in a CPU architecture may require redefining the instruction formats, which may lead to object code incompatibility between code written for an earlier architecture and the newer, larger architecture. This may mean that applications written for the older architecture could not exploit the larger number of registers in the newer architecture without first being recompiled for the new architecture.

Thus, the problem remaining in the prior art is to provide a method and system that permits a CPU to address a larger register file, while the CPU continues to run object code compiled for a CPU having fewer registers and run new object code compiled to take advantage of a newer architecture having a greater number of registers.

SUMMARY OF THE INVENTION

It is therefore one object of the present invention to provide an improved data processing system.

It is another object of the present invention to provide an improved method and system for addressing register files in a data processing unit.

It is yet another object of the present invention to provide an improved method and system for addressing register files in an indexed mode.

The foregoing objects are achieved as is now described. In a data processing unit having a plurality of general purpose registers, an instruction is loaded. Such an instruction includes an operation, and at least one operand field, where the operand field specifies one of a plurality of base registers and a displacement value. To calculate a general purpose register address specified by such an operand field, the displacement value is added to a base value stored in a base register that is specified by a portion of the operand field. Finally, the data processing unit addresses a selected one of the general purpose registers, utilizing the calculated general purpose register address, for execution of the specified operation. Thus, the data processing unit is capable of addressing a larger number of general purpose registers than may be directly addressed utilizing a value represented by a limited number of bits within the operand field.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
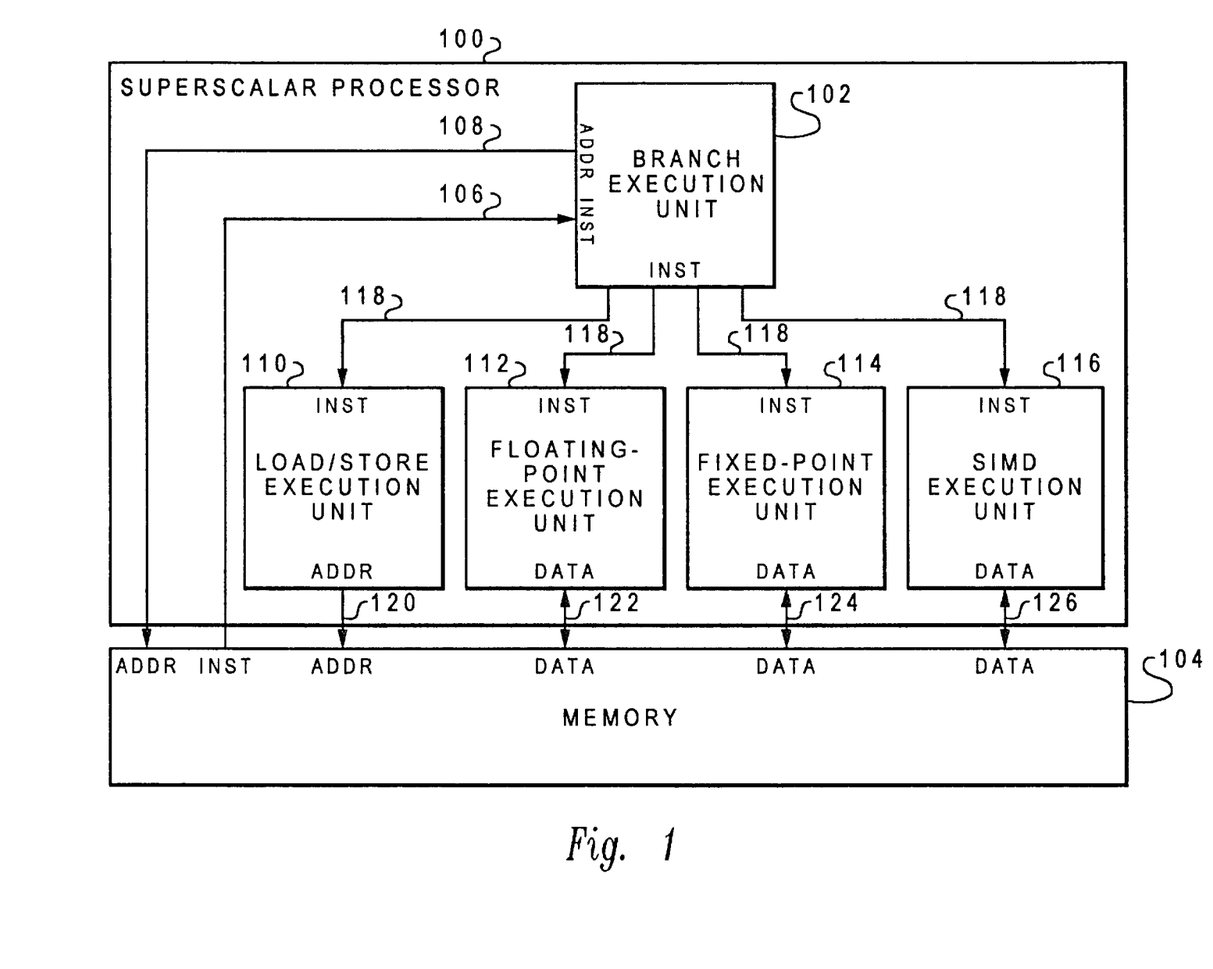
FIG. 1 depicts a high-level block diagram of a superscalar data processing system having a data processing unit including an SIMD execution unit in accordance with a preferred embodiment of the present invention.

With reference now to the figures and in particular with reference to FIG. 1, there is depicted a high-level block diagram of a superscalar data processing system having an SIMD execution unit in accordance with a preferred embodiment of the method and system of the present invention. As illustrated, superscalar data processing system 100 includes branch execution unit 102, which is coupled to memory 104 via instruction bus 106 and address bus 108. Branch execution unit 102 fetches instructions from memory 104 and dispatches such instructions to execution units 110–116 via instruction dispatch buses 118. Instruction dispatch buses may be implemented with a few buses shared by all execution units in superscalar data processing system 100, or multiple, dedicated buses for each execution unit.

Memory 104 may be implemented in different hierarchical levels of memory having different speeds and capacities. Such levels of memory may be structured such that from the viewpoint of any particular level in the hierarchy, the next lowest level is considered to be a cache. A cache memory is an auxiliary memory that provides a buffering capability by which a relatively slow and large main memory can interface to an execution unit such as branch execution unit 102 (or to a next higher level of memory) at the cycle time of such an execution unit.

In the example illustrated in FIG. 1, execution unit 116 is an SIMD execution unit, or a "vector processor" execution unit. Thus, within superscalar data processing system 100, branch execution unit 102 interfaces with SIMD execution unit 116 as another "execution class" among the variety of classes of execution units present in superscalar data processing system 100.

Other execution units within superscalar data processing system 100 may include: load/store execution unit 110, floating-point execution unit 112, and fixed-point execution unit 114. Load/store execution unit 110, which is coupled to memory 104 via bus 120, may be utilized to calculate addresses and provide such addresses to memory 104 during the execution of instructions that require memory access. Load/store execution unit 110 may be utilized to provide an address to memory 104 during the execution of instructions in other execution units.

Floating-point execution unit 112, which is coupled to memory 104 via bus 122, may be utilized to perform floating-point arithmetic operations. Fixed-point execution unit 114 is coupled to memory 104 via bus 124. SIMD execution unit 116 is coupled to memory 104 via bus 126, which is discussed in greater detail below.

Figure 2:
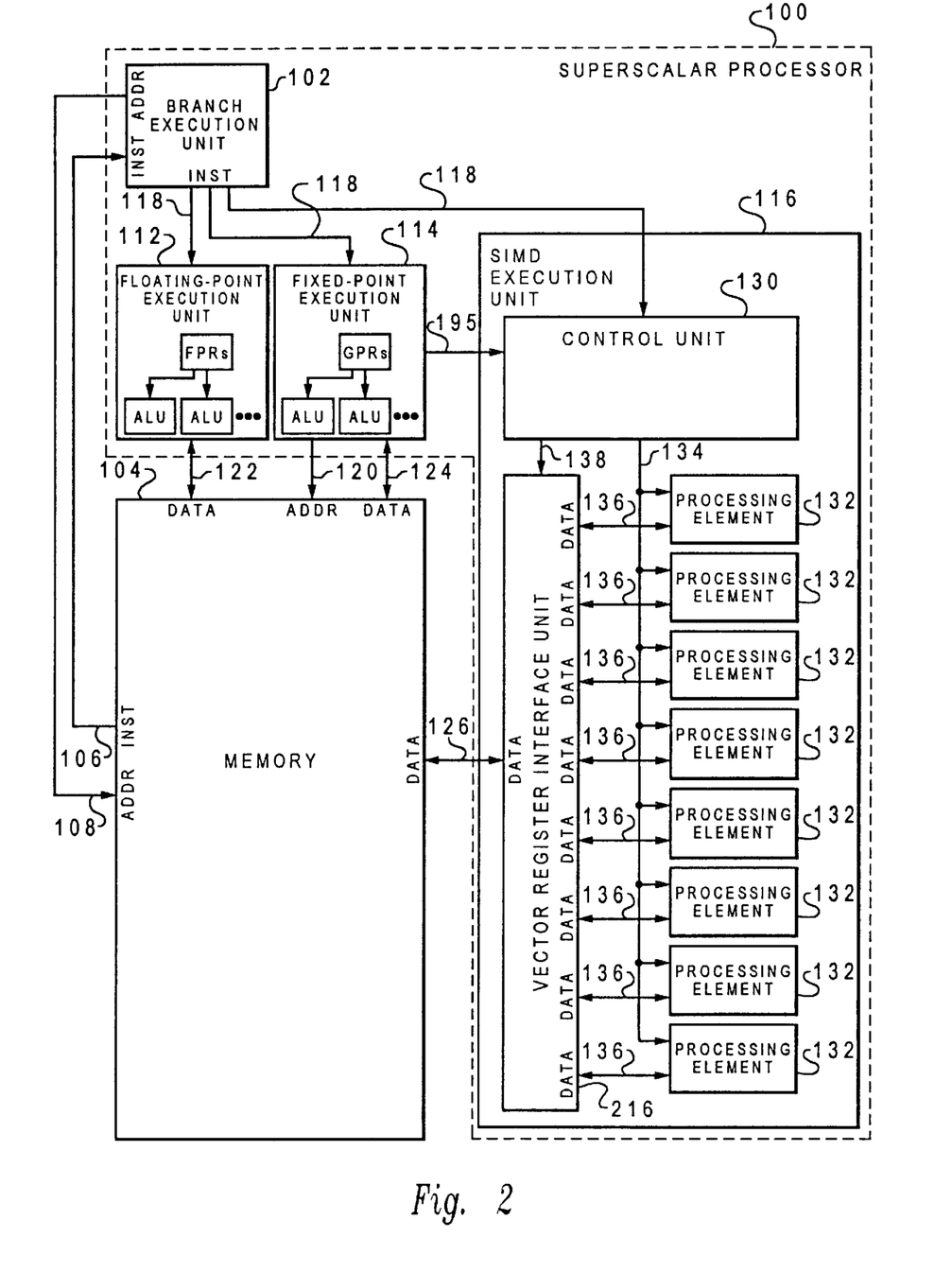
FIG. 2 is a high-level block diagram which further illustrates the components within the SIMD execution unit in accordance with the method and system of the present invention.

With reference now to FIG. 2, there is depicted a high-level block diagram which generally illustrates the components within superscalar data processing system 100 (see FIG. 1), and more specifically illustrates components within SIMD execution unit 116 and the interface between SIMD execution unit 116 and other components in superscalar data processing system 100 in accordance with the method and system of the present invention. As illustrated, superscalar data processing system 100 includes branch execution unit 102, floating-point execution unit 112, fixed-point execution unit 114, and SIMD execution unit 116. In this example, fixed-point execution unit 114 performs the role of load/store execution unit 110, which is illustrated in FIG. 1.

Branch execution unit 102 provides address signals to memory 104 via address bus 108, and receives instructions from memory 104 via instruction bus 106. Such received instructions are then dispatched to selected execution units—including floating-point execution unit 112, fixed-point execution unit 114, and SIMD execution unit 116,— via instruction buses 118. Branch execution unit 102 dispatches instructions to an execution unit that is designated to perform the type of operation represented by the dispatched instruction. For example, an instruction representing a floating-point arithmetic operation is dispatched by branch execution unit 102 to floating-point execution unit 112.

Floating-point execution unit 112 may include a plurality of arithmetic logic units (ALUs) coupled to a group of "floating-point registers" (FPRs). Floating-point execution unit 112 is coupled to memory 104 via data bus 122. Similarly, fixed-point execution unit 114 may include a plurality of arithmetic logic units coupled to a group of "general purpose registers" (GPRs), and may be coupled to memory 104 via address bus 120 and data bus 124. Fixed-point execution unit 114 may calculate and provide addresses for all data memory accesses, thereby performing the role of load/store execution unit 110, which is illustrated in FIG. 1.

In the embodiment illustrated, SIMD execution unit 116 includes control unit 130, vector register interface unit 216, and a plurality of processing elements 132. Control unit 130 provides controls for processing elements 132 by dispatching processing element commands to selected processing elements 132 via command bus 134. Control unit 130 also provides control signals via bus 138 to vector register interface unit 216, where such control signals control the transfer of data between memory 104 and selected processing elements 132. Memory 104 is coupled to vector register interface unit 216 via data bus 126. Vector register interface unit 216 is also coupled to every processing element 132 with plurality of separate data buses 136.

In a preferred embodiment, control unit 130 includes three main functional units: (1) an instruction assembly unit, (2) an instruction expansion unit, and (3) a command dispatch unit. The instruction assembly subunit within control unit 130 provides the instruction and control interface with other execution units within superscalar data processing system 100 by receiving, buffering, and pipelining vector instructions dispatched from branch execution unit 102. Control unit 130 also receives and buffers storage access control information from fixed-point execution unit 114 transmitted on interface bus 195. Such storage access control information may include addresses calculated by fixed-point execution unit 114 and vector length information which may be used by fixed-point execution unit 114 to determine the size of a memory access.

Control unit 130 holds dispatched instructions and associated control information until branch execution unit 102 commits the instruction to complete execution. After branch execution unit 102 commits an SIMD execution unit to complete, no previously dispatched instruction can cause the SIMD execution unit instruction to abort.

An instruction queue within control unit 130 stores dispatched instructions awaiting execution. If the instruction queue is nearly full, control unit 130 notifies branch execution unit 102 that the SIMD execution unit 116 is unable to accept additional instructions. Instructions are released from the instruction queue for execution after receiving a completion signal from branch execution unit 102. Such a completion signal commits the instruction to complete. Branch execution unit 102 commits an instruction to complete after evaluating data, address, and control flow hazards that may occur because of out-of-order execution of instructions in other execution units.

The instruction expansion unit within the instruction control unit translates SIMD execution unit instructions into commands which may be dispatched to selected processing elements 132 and executed simultaneously within such selected processing elements 132 to carry out the SIMD execution unit instruction. When the instruction expansion subunit dispatches commands to several selected processing elements 132, such selected processing elements may be coordinated to provide portions of a vector which is the result of a vector calculation. For example, if a vector contains sixteen elements, eight processing elements 132 may each be utilized to execute two commands utilizing two elements as operands to produce a full sixteen-element vector result. Thus, two sets of commands are dispatched from the instruction expansion subunit to coordinate eight processing elements in operating on two elements each to produce the full sixteen-element vector result.

The command dispatch unit within the instruction control unit dispatches subsection commands (which includes processing element commands) as dispatch conditions are met. Such dispatched conditions include the detection that no register dependency collisions have occurred and the condition that all processing elements are ready to receive commands (i.e., input queues are not full). The command dispatch logic enables out-of-order execution of processing element commands generated by the instruction expansion unit. Such out-of-order execution allows parallel execution of loads or stores with execution of arithmetic operations.

In a vector load operation, when fixed-point execution unit 114 sends a sequence of requests for data to memory 104 on behalf of SIMD execution unit 116, the data requested may not be returned to SIMD execution unit 116 in the order in which the data was requested. For example, if requested data resides in cache memory (part of the hierarchical structure of memory 104), memory 104 may respond within a short period of time by sending the requested data to SIMD execution unit 116. However, if requested data is not located in the relatively fast cache memory, such requested data may be retrieved from a memory location having a relatively high latency compared with the latency of cache. This means that memory 104 sends some requested data to SIMD execution unit 116 sooner than other data.

While SIMD execution unit 116 is waiting for data from a slower memory location, other subsequently requested data may be sent to SIMD execution unit 116 before earlier requested data. To keep track of what data is received by SIMD execution unit 116 as a result of a particular memory request, memory requests are assigned an identifier, which is then later associated with the requested data recalled from memory 104. Such an identifier is then transferred with the requested data to SIMD execution unit 116. Control unit 130 tracks outstanding memory accesses utilizing these assigned identifiers. When all outstanding memory requests have been honored (i.e., data has been received for each outstanding identifier), control unit 130 initiates the transfer of the received data to the processing elements depending on the type of load instruction that was utilized to request the data.

Figure 3:
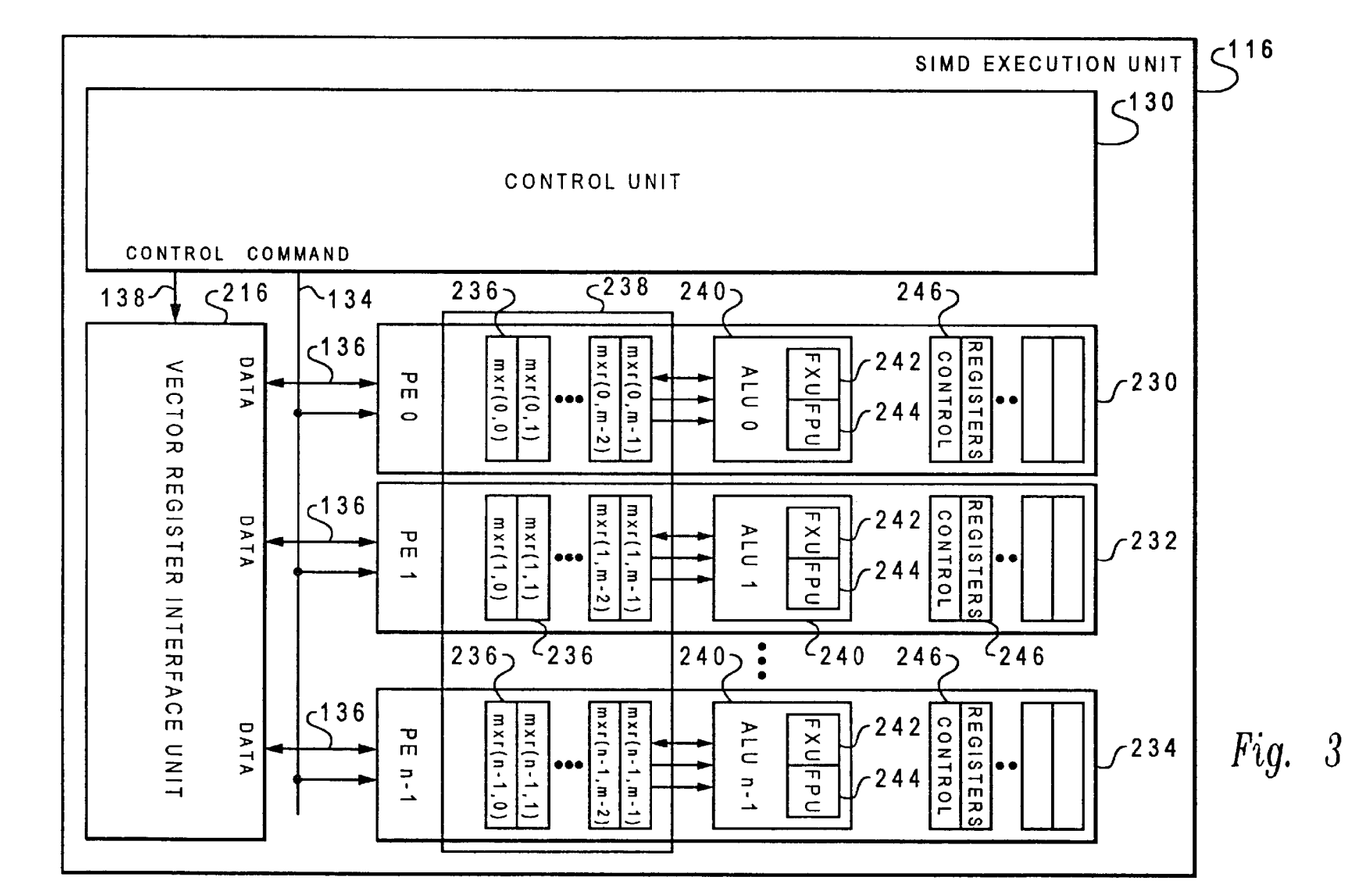
FIG. 3 depicts a more detailed block diagram of a processing element in accordance with the method and system of the present invention.

With reference now to FIG. 3, there is depicted a more detailed representation of processing elements 132 (see FIG. 2) in accordance with the method and system of the present invention. As illustrated, a plurality of processing elements 230–234 (same as processing elements 132 in FIG. 2) are coupled to control unit 130 via common command bus 134 and individual data buses 136 coupled to each processing element 230–234.

In one embodiment of the present invention, processing elements 230–234 each include a register file 236, which may include 512 64-bit registers. Each register may be utilized to store an element in a vector and be used by an arithmetic logic unit (discussed below) to perform various operations. Together, register files 236 associated with each processing element 230–234 form a register array 238 having n sequentially numbered rows of registers and m sequentially numbered columns of registers. Thus, if register files 236 each include 512 registers, and SIMD execution unit 116 contains eight processing elements 230–234, register array 238 includes eight rows of registers and 512 columns of registers.

Vector registers, comprising a plurality of elements, are formed in the columns of register array 238. Additionally, a single vector register may be comprised of registers in more than one column, thereby permitting vector registers having a number of elements larger than n elements.

Each processing element 230–234 may also include an arithmetic logic unit 240. Such an arithmetic logic unit 240 may include both a fixed-point execution unit 242 and a floating-point execution unit 244. Preferably, both fixed- and floating-point execution units have a design similar to fixed-point execution unit 114 and floating-point execution unit 112 in superscalar processor 100 of FIG. 1. By using similar designs, the expense of designing and testing new fixed- and floating-point execution units may be saved. Arithmetic logic unit 240 utilizes operands stored in register file 236 and stores results of operations back into register file 236. Thus, an instruction word intended for execution by arithmetic logic unit 240 may include fields containing data that specifies registers to be utilized for source operands and a register for storing the result of such instruction execution.

Also included within processing elements 230–234 are control registers 246. Some control registers 246 may contain status information reflecting the condition of similar registers in control unit 130. Other control registers 246 may be used during operations that require indexed or indirect addressing of registers in register file 236. Examples of control registers 246 includes base registers, which are discussed below with reference to FIG. 5.

Figure 4:
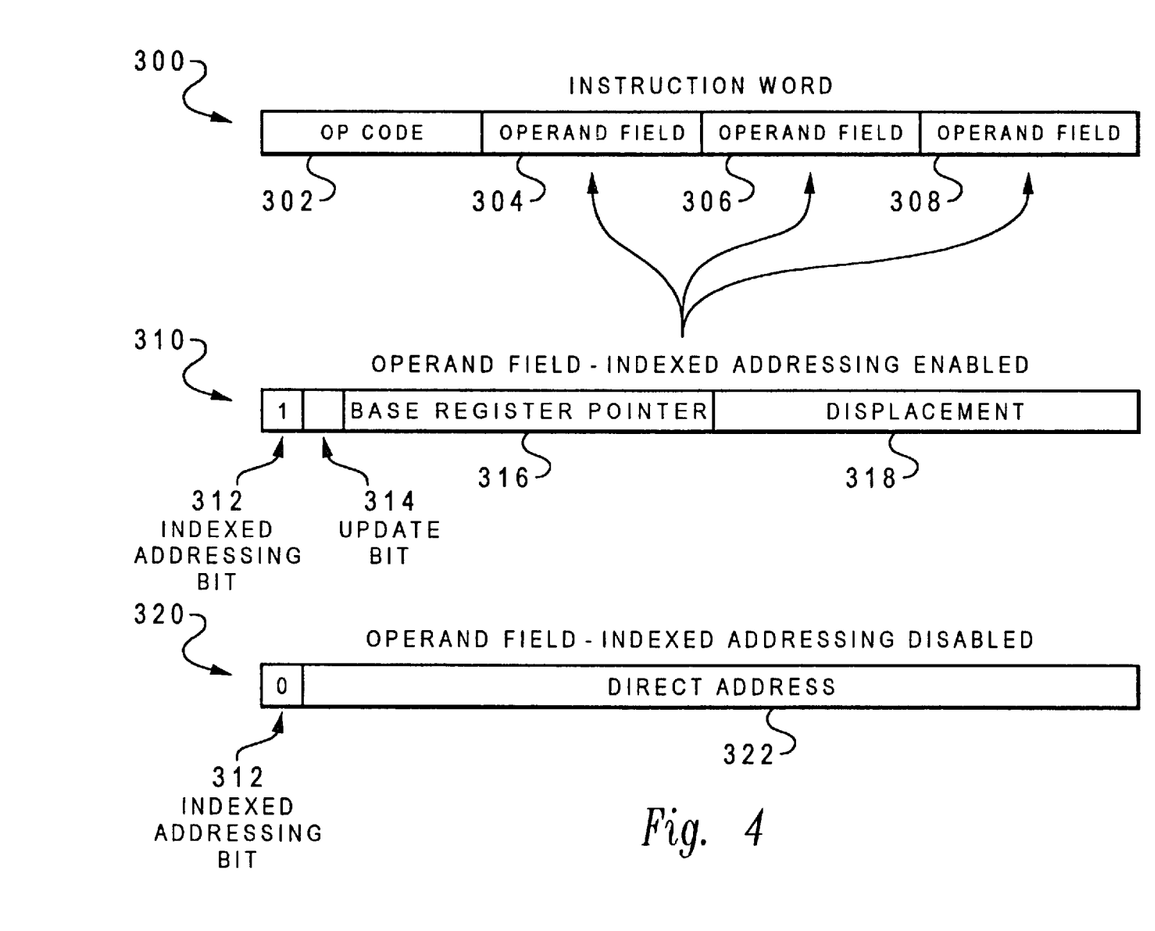
FIG. 4 illustrates fields of an instruction word in accordance with the method and system of the present invention.

Referring now to FIG. 4, there is depicted various fields of an instruction word in accordance with the method and system of the present invention. As illustrated, instruction word 300 includes operation code (OP code) field 302, operand field 304, operand field 306, and operand field 308. In a preferred embodiment, instruction word 300 includes 64 bits, operation code field 302 includes 31 bits, and each operand field 304–308 includes 11 bits. OP code field 302 may specify an operation to be performed by a data processing unit, such ALU 240 of processing element 230 in FIG. 3. Such operations typically require the use of registers, such as those contained in register file 236 of FIG. 3.

Operations specified by OP code 302 may utilize three operands: a target operand, which may be stored in operand field 304; an A operand, which may be stored in operand field 306; and a B operand, which may be stored in operand field 308. An example of an instruction that may be specified by OP code 302 is an instruction which adds a value contained in a register specified by operand A in operand field 306 to a value contained in a second register specified by operand B in operand field 308 and then stores the result of such an add operation in a target register specified by target operand in operand field 304. Those persons skilled in the art should recognize that not all instructions specified by OP code 302 will require all operands which may be stored in operand fields 304–308—other instructions may use from zero to three operands. Some architectures support a fourth operand for instructions such as multiply-add (T=A×B+C). When a fourth operand is supported, those architectures define a fourth operand field in the instruction format at the expense of opcode bits or size of the other three operand fields.

When an indexed addressing mode has been enabled, the operand field utilizing the index mode will contain a value having a format illustrated at operand 310. As illustrated, operand 310 includes indexed addressing bit 312, update bit 314, base register pointer field 316, and displacement field 318. Indexed addressing bit 312 is utilized to indicate whether or not indexed addressing has been enabled. In this example, indexed addressing has been enabled when indexed addressing bit 312 equals one.

Figure 5:
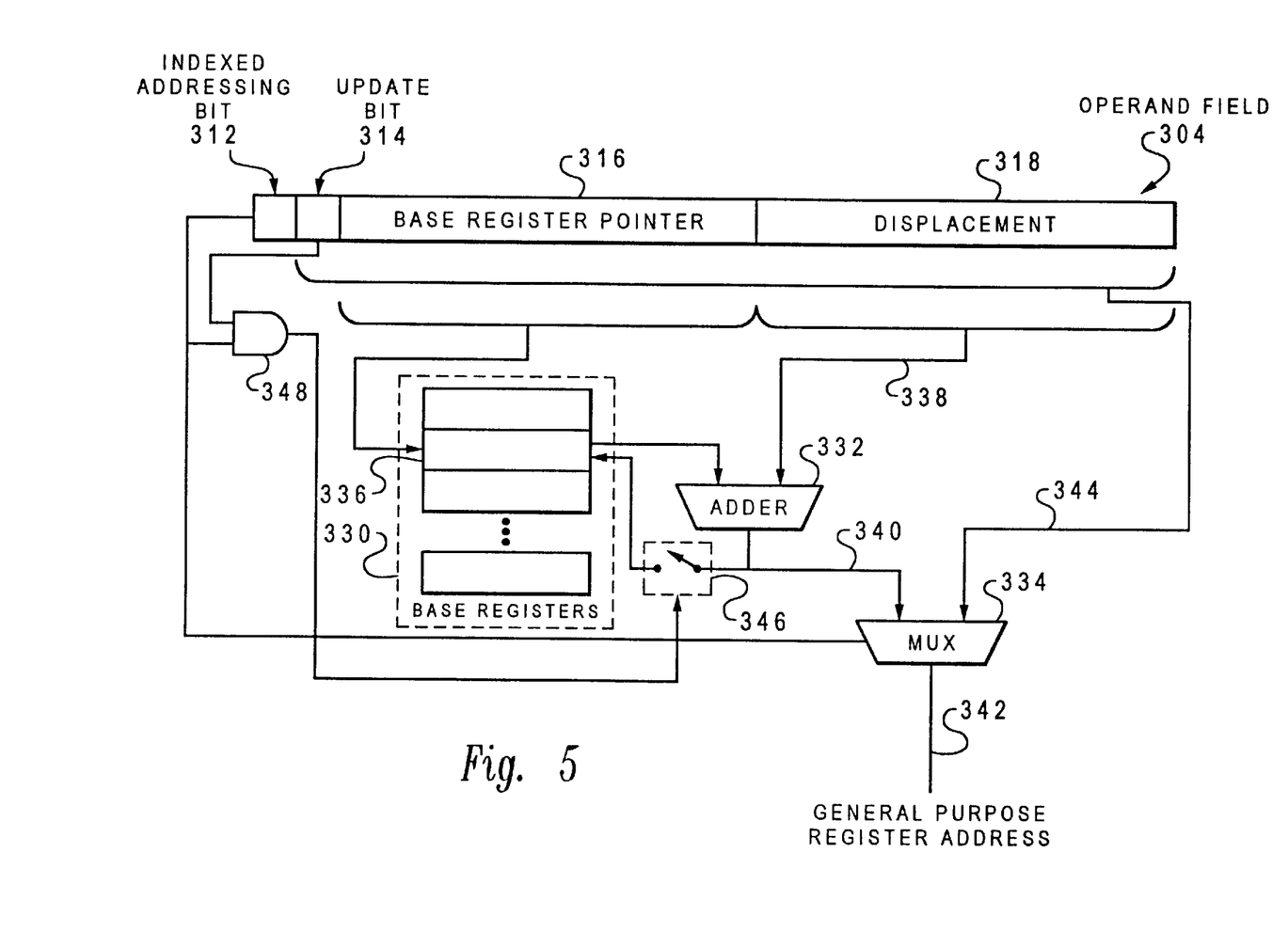
FIG. 5 is a high-level block diagram which illustrates the generation of a general purpose register address in accordance with the method and system of the present invention.

Base register pointer field 316 is utilized to store a value that points to, or addresses, one of a plurality of base registers. Such base registers are illustrated in FIG. 5, and discussed below. Displacement field 318 may be utilized to store a signed displacement value, which will be used in the calculation of a general purpose register address.

Update bit 314 indicates whether or not the base register pointed to by the value in base register pointer field 316 will be updated with the calculated general purpose register address. This update function is discussed in greater detail below with reference to FIG. 5.

If indexed addressing bit 312 is set such that indexed addressing mode is disabled, the operand field contains a value in a format depicted at operand field 320. In this example, indexed addressing mode is disabled when indexed addressing bit 312 is set to zero. When the indexed addressing mode is disabled, every bit in the operand field except indexed addressing bit 312 may be utilized to specify a direct general purpose register address, as illustrated by direct address field 322. Operand fields 304–308 of instruction word 300 may each independently utilize the indexed addressing mode or the direct addressing mode.

With reference now to FIG. 5, there is depicted a high-level block diagram which illustrates the major components and data flow utilized to implement indexed addressing in accordance with the method and system of the present invention. As illustrated, operand field 304 includes indexed addressing bit 312, whether or not indexed addressing mode is enabled. If indexed addressing mode is enabled, the remainder of operand field 304 may include update bit 314, base register pointer field 316, and displacement field 318. If indexed addressing mode is not enabled, the remainder of operand field 304 may include direct address field 322 (which is not illustrated in FIG. 5). Other components utilized in indexed mode addressing include base registers 330, adder 332, and multiplexer 334.

When indexed addressing mode is enabled by setting indexed addressing bit 312, the value in base register pointer field 316 points to a base register, such as base register 336. Thereafter, the value stored in base register 336 is input to adder 332, where it is added to the value stored in displacement field 318, as indicated by data flow 338. The output of adder 332 is then input to MUX 334, as indicated by data flow 340. When indexed addressing mode is selected, MUX 334 selects data 340 to be utilized as general purpose register address 342.

When indexed addressing mode is not selected, the value of indexed addressing bit 312 causes multiplexer 334 to select the value contained in direct address field 322 (see FIG. 4), as illustrated by data flow 344. Thus, in such a direct addressing mode, general purpose register address 342 is equal to the value in direct address field 322 (see FIG. 4) as indicated by data flow 344.

If indexed addressing bit 312 and update bit 314 are set, the processor operates in an indexed addressing mode with update. In this mode, general purpose register address 342 is calculated in the same manner described above with reference to the indexed mode, and then the selected base register in register file 330 is updated with the value calculated by adder 332, which is equal to general purpose register address 342. This update process is pictorially illustrated by switch 346 and gate 348, which allows the output of adder 332 to be placed back into base register 336 when indexed addressing bit 312 and update bit 314 are both set.

Figure 6:
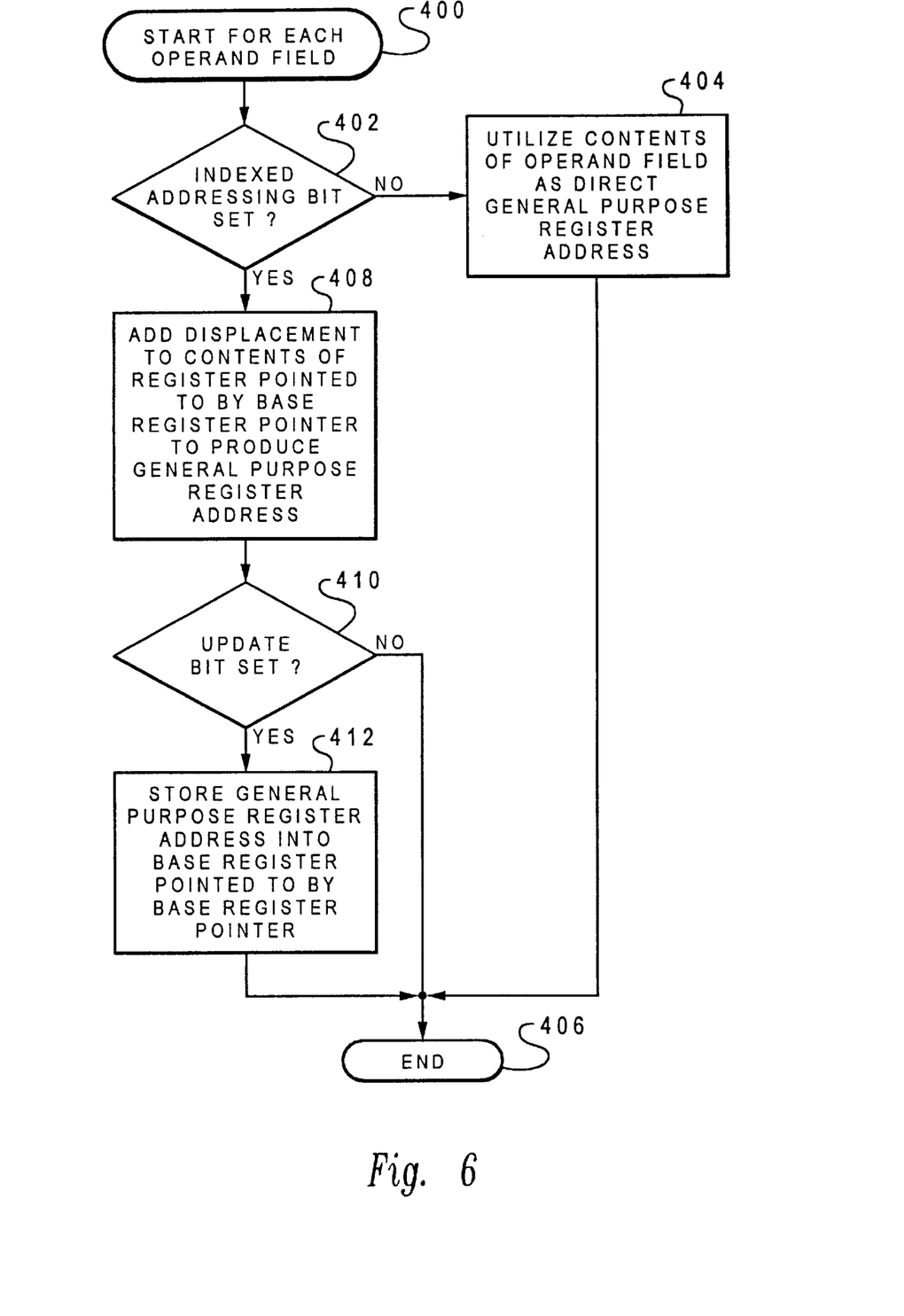
FIG. 6 is a high-level flowchart illustrating the process of calculating a general purpose register address and updating a base register in accordance with the method and system of the present invention.

With reference now to FIG. 6, there is depicted a high-level flowchart illustrating the process of calculating a general purpose register address in accordance with the method and system of the present invention. As illustrated, the process—which is conducted for each operand field—begins at block 400, and thereafter passes to block 402. Block 402 illustrates the process of determining whether or not indexed addressing mode has been selected as indicated by the indexed addressing bit. If the indexed addressing mode has not been selected, the process utilizes the remaining contents of the operand field as a direct general purpose register address, as depicted at block 404. Thereafter, the process of generating a general purpose register address ends, as illustrated at block 406.

Referring again to block 402, if the indexed addressing mode has been selected, the contents of the displacement field—a signed value—is added to the contents of the base register that is pointed to by the base register pointer to produce a general purpose register address, as illustrated at block 408.

Next, the process determines whether or not the update bit is set to select an update mode, as depicted at block 410. If the update mode has not been selected, the general purpose register address is equal to the result of the add operation performed at block 408, and the process ends, as depicted at block 406. If the update mode is selected, the result of the add operation at block 408 is stored in the base register that is pointed to by the base register pointer, as illustrated at block 412. In the update mode, a general purpose register address is also calculated, and that address is equal to the add operation performed at block 408. After the base register is updated as depicted at block 412, the process of calculating a general purpose register address ends, as depicted at block 406.

While indexed addressing of general purpose registers with data stored in base registers and operand fields of an instruction word is described above with reference to a superscalar data processing system having an SIMD processing element, those persons skilled in the art should recognize that scalar processing systems having a much less complex design may also benefit from the method and system disclosed herein. Thus, virtually any central processing unit having a plurality of general purpose registers may utilize the present invention to specify a general purpose register address in the operand field of an instruction word intended for that central processing unit.

While the invention has been particularly shown and described with reference to a preferred embodiment, it will be understood by those skilled in the art that various changes in form and detail may be made therein without departing from the spirit and scope of the invention.

What is claimed is:

1. A method in a data processing unit for addressing general purpose registers within said data processing unit, wherein said data processing unit includes an adder and a plurality of base registers for storing base values, said method comprising the steps of:

loading an instruction into said data processing unit, wherein said instruction includes an operation and at least one operand field having a length of m+1 bits, said operand field including a single index addressing bit;

if said single index addressing bit is not set:

addressing one of the $2^m$ general purpose registers utilizing an address specified by m bits within said at least one operand field;

if said single index addressing bit is set:

addressing a selected one of said plurality of base registers utilizing an address specified by n bits within said at least one operand field, where n is less than m;

adding a base value stored within said selected one of said plurality of base registers to a displacement value specified by m−n bits within said at least one operand field to form a p bit address where p>m; and addressing one of $2^p$ general purpose registers utilizing said p bit address wherein said data processing unit is operable in two addressing modes utilizing a fixed-length operand field such that a larger number of general purpose registers may be directly addressed while maintaining compatibility with software written for older data processing units.

2. The method according to claim 1 wherein said at least one operand field further includes an update bit and wherein said method further includes the step of:

enabling an update mode utilizing said update bit; and only in response to enablement of said update mode, storing said p bit address in said selected one of said plurality of base registers, wherein a new base value is created.

3. A data processing unit comprising:

a plurality of base registers;

a plurality of general purpose registers;

means for loading an instruction into said data processing unit wherein said instruction includes an operation and at least one operand field having a length of m+1 bits, said operand field including a single index addressing bit;

means for determining a state of said single index addressing bit;

means for addressing one of the $2^m$ general purpose registers utilizing an address specified by m bits within said at least one operand field in response to single index addressing bit being not set;

means for addressing a selected one of said plurality of base registers utilizing an address specified by n bits within said at least one operand field, wherein n<m, in response to said single index addressing bit being set;

means for adding a base value stored within said selected one of said plurality of base registers to a displacement value specified by m−n bits within said at least one operand field to form a p bit address, where p>m, in response to said single index addressing bit being set; and means for addressing one of $2^p$ general purpose registers utilizing said p bit address wherein said data processing unit is operable in two addressing modes utilizing a fixed-length operand field such that a larger number of general purpose registers may be directly addressed while maintaining compatibility with software written for older data processing units.

4. The data processing unit according to claim 3, wherein said at least one operand field further includes an update bit and wherein said data processing unit further comprises:

means for enabling an update mode utilizing said update bits; and means for storing said p bit address in said selected one of said plurality of base registers only in response to enablement of said update mode wherein a new base value is created.

* * * * *